Feb. 20, 1923.

H. G. THOMPSON.
HANDLE.
FILED MAY 2, 1921.

1,446,137.

Inventor
Henry G. Thompson
by
Thurston Kwis & Hudson
attys.

Patented Feb. 20, 1923.

1,446,137

UNITED STATES PATENT OFFICE.

HENRY G. THOMPSON, OF CLEVELAND, OHIO.

HANDLE.

Application filed May 2, 1921. Serial No. 466,130.

*To all whom it may concern:*

Be it known that I, HENRY G. THOMPSON, a citizen of the United States, residing at Cleveland, in the county of Cuyahoga and State of Ohio, have invented a certain new and useful Improvement in Handles, of which the following is a full, clear, and exact description.

The present invention has for its object the provision of a handle which is particularly intended for use as a handle for storage battery boxes.

Such a handle must necessarily be made at low cost and in the present instance the handle is made from a unitary blank of sheet metal which is so constructed as to impart stiffness to the sheet of metal, the elements which impart stiffness being for the most part elements which also have additional functions in the use or application of the handle to the battery box.

An additional object is to provide a handle in which the handle is constructed such that it may be used with battery boxes of various makes of battery in which the spacing screws for the handle may vary.

Figure 1:
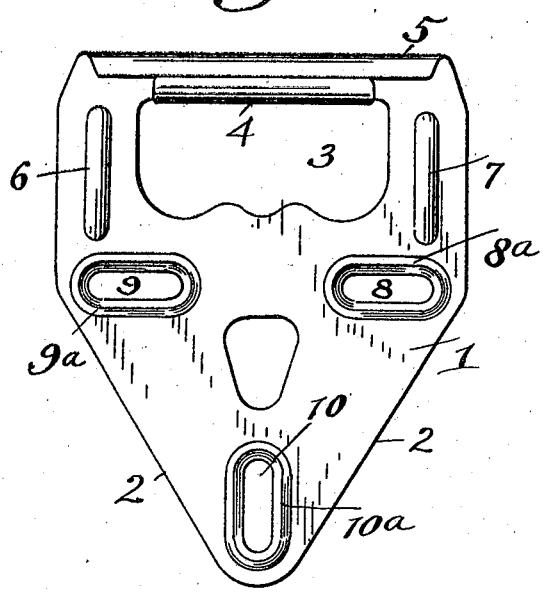
Figure 3:
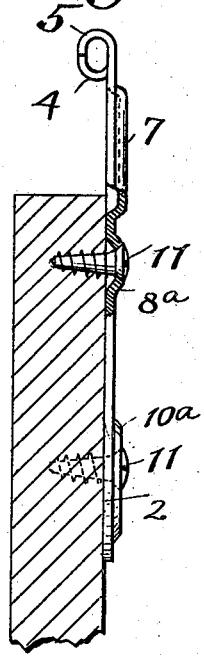
Figure 2:
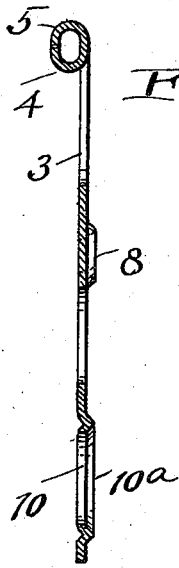

Reference should be had to the accompanying drawings forming a part of this specification in which Fig. 1 is a front elevation of the handle; Fig. 2 is a vertical section through the handle; Fig. 3 is a vertical section through the handle showing the application to a box.

Referring to the drawings, 1 indicates the sheet of metal from which the handle is formed, the lower part of the handle is formed with converging sides such as indicated at 2 which make a neat appearance and at the same time conserve metal. At the upper part of the handle a portion is cut away to provide a space such as indicated at 3 but a portion of the metal along the upper edge of the opening 3 is retained and bent upwardly to form a part of the hand gripping portion of the metal, as indicated at 4. Also the metal at the upper part of the sheet is curved or bent inwardly as indicated at 5 so that the edges of the bent portions 4 and 5 contact, thereby forming a completed hand grip for the handle. This folding of the metal in the manner which has been described not only is functionally useful in providing the gripping portion of the metal, but also serves to stiffen the sheet metal handle.

Extending vertically are two beads or struck-up portions as indicated at 6 and 7, these serving to stiffen the sheet metal at portions which are below the hand gripping portion.

Below the opening 3 there are two transversely extending slots 8 and 9. These slots are elongated and each slot is surrounded by a struck-up portion or bead which is indicated at $8^a$ and $9^a$. At the lower portion of the handle 1 or adjacent to the converging sides 2 there is a vertically extended elongated slot 10, and surrounding this slot there is a bead $10^a$ which is similar in all respects to the beads $8^a$ and $9^a$ which have been previously referred to.

The slots 8, 9 and 10 are adapted to receive screws such as indicated at 11 in Fig. 3 which screws are for the purpose of securing the handle to the wooden box which contains the battery.

These slots 8, 9, and 10 are elongated, this being for the purpose of enabling the handle to be used on a battery box, particularly where replacement of handles are needed and where on the boxes the screw holes may vary in position. By this we mean that on certain battery boxes the spacing between the screw holes may be two inches, while on the other battery boxes, the spacing may be three inches, thus in order to provide handles for replacement for these boxes, two different handles would be required and in order to avoid this contingency, the present handle is made with the elongated slots which give sufficient range to accommodate practically all the spacing or holding screws on the various battery boxes with which I am familiar.

The beading surrounding the screw receiving slots or openings serves a double purpose. In the first place it provides elongated beads which stiffen the metal and gives considerable resistance against bending of the sheet metal of which the handle is made. Additionally, these beads serve as a protection to the beads of the screws against being attacked by the acid which may slip over onto the handles inasmuch as any acid which may flow down the handle will be deflected by the beads $8^a$, $9^a$ and $10^a$, so that it will not reach the beads of the screws which as will be understood, are readily attacked and corroded by the acid.

The handle is coated with some material which is not attacked by battery acid and I have found in practice, that a coating of lead is very effective for the purpose. This coating of lead may be applied by dipping the handles into molten lead or in any other manner which may be desired.

Having described my invention, I claim

An integral sheet metal handle comprising a body portion having an opening and a gripping portion above the opening, the said metal sheet at portions below the said opening being provided with elongated slots which are adapted to receive fastening means, the said elongated slots being provided with upstanding beads which surround the said slots for the purpose described.

In testimony whereof, I hereunto affix my signature.

HENRY G. THOMPSON.